United States Patent
Hall et al.

(10) Patent No.: US 7,495,848 B2
(45) Date of Patent: Feb. 24, 2009

(54) CAST LASER OPTICAL BENCH

(75) Inventors: Daniel F. Hall, Torrance, CA (US); Jason K. Miura, Lomita, CA (US); James M. Zamel, St. Charles, MO (US)

(73) Assignee: Northrop Grumman Corporation, Los Angeles, CA (US)

( * ) Notice: Subject to any disclaimer, the term of this patent is extended or adjusted under 35 U.S.C. 154(b) by 869 days.

(21) Appl. No.: 10/626,291

(22) Filed: Jul. 24, 2003

(65) Prior Publication Data

US 2005/0018742 A1    Jan. 27, 2005

(51) Int. Cl.
G02B 7/02 (2006.01)
(52) U.S. Cl. .................... 359/819; 359/811; 359/812
(58) Field of Classification Search ............ 359/819, 359/822, 823, 813, 811, 814, 824
See application file for complete search history.

(56) References Cited

U.S. PATENT DOCUMENTS

| | | | |
|---|---|---|---|
| 3,339,151 A | 8/1967 | Smith | 331/94.5 |
| 3,590,248 A | 6/1971 | Chatterton | 250/199 |
| 3,633,126 A | 1/1972 | Martin et al. | 331/94.5 |
| 3,683,296 A | 8/1972 | Scalise | 331/94.5 |
| 3,771,031 A | 11/1973 | Kay | 317/235 R |
| 3,810,041 A | 5/1974 | Martin | 331/94.5 |
| 3,962,655 A | 6/1976 | Selway et al. | 331/94.5 |
| 4,057,101 A | 11/1977 | Ruka et al. | 165/1 |
| 4,092,614 A | 5/1978 | Sakuma et al. | 331/94.5 |
| 4,150,341 A | 4/1979 | Ferguson | 331/94.5 |
| 4,228,406 A | 10/1980 | Lewis et al. | 331/94.5 |
| 4,233,567 A | 11/1980 | Chernoch | 331/94.5 |
| 4,315,225 A | 2/1982 | Allen, Jr. et al. | 372/35 |
| 4,378,601 A | 3/1983 | Eggleston, III et al. | 372/66 |
| 4,383,270 A | 5/1983 | Schelhorn | 357/71 |
| 4,393,393 A | 7/1983 | Allen, Jr. et al. | 357/81 |

(Continued)

FOREIGN PATENT DOCUMENTS

EP    0253935    1/1988

(Continued)

OTHER PUBLICATIONS

Ahern, W.E., "Thermal Spacer for Room Temperature Close-Packed GaAs Laser Arrays," IBM Technical Disclosure Bulletin, May 1970, vol. 12, No. 12, p. 2133.

(Continued)

Primary Examiner—Scott J Sugarman
Assistant Examiner—Brandi N Thomas
(74) Attorney, Agent, or Firm—Nixon Peabody LLP

(57) ABSTRACT

An optical bench 10 is cast from a single piece of material and provided with a number of optical component supports 14 which extend upwardly from a base 12. The optical component supports 14 are integral with the base 12, increasing their rigidity. The bench 10 may be cast with additional material in strategic areas to allow for future optimization of the bench 10—for example, the mounting of specific optical components throughout the bench 10. Further, the bench 10 may be provided with regions 24, 26, and 28 of varying rigidity by placing support struts 68 closer together in areas where greater rigidity is required. Apertures 30 may be provided in the bench 10 to enable the routing of conduits through the bench 10.

6 Claims, 4 Drawing Sheets

U.S. PATENT DOCUMENTS

| | | | |
|---|---|---|---|
| 4,415,234 A | 11/1983 | Meyers | 350/310 |
| 4,454,602 A | 6/1984 | Smith | 372/36 |
| 4,468,774 A | 8/1984 | Robbins | 372/34 |
| 4,475,790 A | 10/1984 | Little | 350/96.21 |
| 4,528,671 A | 7/1985 | Robbins | 372/68 |
| 4,573,067 A | 2/1986 | Tuckerman et al. | 357/82 |
| 4,575,854 A | 3/1986 | Martin | 372/75 |
| 4,617,585 A | 10/1986 | Yasui | 357/72 |
| 4,617,724 A | 10/1986 | Yokoyama et al. | 29/576 B |
| 4,621,006 A * | 11/1986 | Terry et al. | 428/116 |
| 4,653,061 A | 3/1987 | Fukae | 372/66 |
| 4,673,030 A | 6/1987 | Basiulis | 165/32 |
| 4,699,465 A | 10/1987 | Rice et al. | 350/162.11 |
| 4,710,940 A | 12/1987 | Sipes, Jr. | 372/75 |
| 4,716,568 A | 12/1987 | Scifres et al. | 372/36 |
| 4,730,324 A | 3/1988 | Azad | 372/33 |
| 4,731,795 A | 3/1988 | Clark et al. | 372/107 |
| 4,792,930 A | 12/1988 | Kobayashi et al. | 367/140 |
| 4,847,848 A | 7/1989 | Inoue et al. | 372/50 |
| 4,852,109 A | 7/1989 | Kuchar | 372/34 |
| 4,881,233 A | 11/1989 | von Arb et al. | 372/35 |
| 4,881,237 A | 11/1989 | Donnelly | 372/50 |
| 4,901,330 A | 2/1990 | Wolfram et al. | 372/75 |
| 4,916,712 A | 4/1990 | Bender | 372/75 |
| 4,924,474 A | 5/1990 | Yagi et al. | 372/75 |
| 4,942,586 A | 7/1990 | Lai | 372/68 |
| 4,949,346 A | 8/1990 | Kuper et al. | 372/36 |
| 4,963,741 A | 10/1990 | McMullin | 250/338.3 |
| 4,972,426 A | 11/1990 | Steffen | 372/35 |
| 4,975,923 A | 12/1990 | Buus et al. | 372/50 |
| 4,984,246 A | 1/1991 | Cabaret et al. | 372/69 |
| 4,993,041 A | 2/1991 | Sidler et al. | 372/98 |
| 5,005,640 A | 4/1991 | Lapinski et al. | 165/170 |
| 5,012,481 A | 4/1991 | Casteleiro | 372/72 |
| 5,022,042 A | 6/1991 | Bradley | 372/75 |
| 5,031,183 A | 7/1991 | Waters | 372/45 |
| 5,031,187 A | 7/1991 | Orenstein et al. | 372/50 |
| 5,039,043 A * | 8/1991 | Hodge | 248/125.8 |
| 5,040,187 A | 8/1991 | Karpinski | 372/50 |
| 5,073,838 A | 12/1991 | Ames | 361/103 |
| 5,076,348 A | 12/1991 | Bluege | 165/104.17 |
| 5,099,214 A | 3/1992 | Rosen et al. | 333/157 |
| 5,099,488 A | 3/1992 | Ahrabi et al. | 372/361 |
| 5,105,429 A | 4/1992 | Mundinger et al. | 372/34 |
| 5,115,445 A | 5/1992 | Mooradian | 372/75 |
| 5,123,025 A | 6/1992 | Papuchon et al. | 372/72 |
| 5,127,072 A | 6/1992 | Blauvelt et al. | 385/88 |
| 5,128,951 A | 7/1992 | Karpinski | 372/50 |
| 5,156,999 A | 10/1992 | Lee | 437/215 |
| 5,212,699 A | 5/1993 | Masuko et al. | 372/34 |
| 5,212,707 A | 5/1993 | Heidel et al. | 372/50 |
| 5,216,263 A | 6/1993 | Paoli | 257/88 |
| 5,216,688 A | 6/1993 | Kortz et al. | 372/75 |
| 5,222,095 A | 6/1993 | Zediker et al. | 372/108 |
| 5,243,619 A | 9/1993 | Albers et al. | 372/97 |
| 5,253,260 A | 10/1993 | Palombo | 372/34 |
| 5,257,277 A | 10/1993 | Yagi et al. | 372/75 |
| 5,265,113 A | 11/1993 | Halldorsson et al. | 372/36 |
| 5,284,790 A | 2/1994 | Karpinski | 437/129 |
| 5,305,344 A | 4/1994 | Patel | 372/50 |
| 5,311,528 A | 5/1994 | Fujino | 372/35 |
| 5,311,535 A | 5/1994 | Karpinski | 372/50 |
| 5,311,536 A | 5/1994 | Paoli et al. | 372/50 |
| 5,315,154 A | 5/1994 | Elwell | 257/707 |
| 5,325,384 A | 6/1994 | Herb et al. | 372/36 |
| 5,337,325 A | 8/1994 | Hwang | 372/36 |
| 5,351,259 A | 9/1994 | Ishimori et al. | 372/75 |
| 5,394,426 A | 2/1995 | Joslin | 372/50 |
| 5,394,427 A | 2/1995 | McMinn et al. | 372/70 |
| 5,402,436 A | 3/1995 | Paoli | 372/50 |
| 5,402,437 A | 3/1995 | Mooradian | 372/92 |
| 5,438,580 A | 8/1995 | Patel et al. | 372/36 |
| 5,446,749 A | 8/1995 | Nighan, Jr. et al. | 372/22 |
| 5,452,118 A | 9/1995 | Maruska | 359/191 |
| 5,485,482 A | 1/1996 | Selker et al. | 372/75 |
| 5,504,762 A | 4/1996 | Hutchison | 372/29 |
| 5,526,373 A | 6/1996 | Karpinski | 372/101 |
| 5,550,852 A | 8/1996 | Patel et al. | 372/33 |
| 5,561,684 A | 10/1996 | Martin | 372/107 |
| 5,570,387 A | 10/1996 | Carriere et al. | 372/50 |
| 5,590,147 A | 12/1996 | Hobbs et al. | 372/75 |
| 5,597,149 A * | 1/1997 | Hodge | 248/316.4 |
| 5,626,157 A | 5/1997 | Galpin et al. | 134/115 R |
| 5,638,388 A | 6/1997 | Nighan, Jr. et al. | 372/22 |
| 5,663,979 A | 9/1997 | Marshall | 372/103 |
| 5,668,825 A | 9/1997 | Karpinski | 372/101 |
| 5,734,672 A | 3/1998 | McMinn et al. | 372/50 |
| 5,745,514 A | 4/1998 | Patel et al. | 372/43 |
| 5,764,675 A | 6/1998 | Juhala | 372/50 |
| 5,778,132 A | 7/1998 | Csipkes et al. | 385/135 |
| 5,835,518 A | 11/1998 | Mundinger et al. | 372/50 |
| 5,898,211 A | 4/1999 | Marshall et al. | 257/601 |
| 5,913,108 A | 6/1999 | Stephens et al. | 438/109 |
| 5,923,694 A | 7/1999 | Culver | 372/69 |
| 5,985,684 A | 11/1999 | Marshall et al. | 438/26 |
| 5,987,043 A | 11/1999 | Brown et al. | 372/36 |
| 6,026,109 A | 2/2000 | Micke et al. | 372/92 |
| 6,052,392 A | 4/2000 | Ueda et al. | 372/6 |
| 6,052,396 A | 4/2000 | Zamel et al. | 372/34 |
| 6,061,378 A | 5/2000 | Marshall et al. | 372/75 |
| 6,101,206 A | 8/2000 | Apollonov et al. | 372/50 |
| 6,134,258 A | 10/2000 | Tulloch et al. | 372/99 |
| 6,272,164 B1 | 8/2001 | McMinn et al. | 372/50 |
| 6,307,871 B1 | 10/2001 | Heberle | 372/34 |
| 6,310,900 B1 | 10/2001 | Stephens et al. | 372/36 |
| 6,351,478 B1 | 2/2002 | Heberle | 372/36 |
| 6,385,226 B2 | 5/2002 | McMinn et al. | 372/50 |
| 6,570,895 B2 | 5/2003 | Heberle | 372/34 |
| 6,771,437 B1 * | 8/2004 | Willis | 359/819 |
| 6,858,839 B1 * | 2/2005 | Anderson et al. | 250/281 |
| 2004/0032817 A1 * | 2/2004 | Hikake et al. | 369/213 |

FOREIGN PATENT DOCUMENTS

| | | |
|---|---|---|
| EP | 0432009 A1 | 6/1991 |
| EP | 0458469 A1 | 11/1991 |
| EP | 0550996 A1 | 7/1993 |
| EP | 0634822 A1 | 1/1995 |
| EP | 0669684 A2 | 8/1995 |
| EP | 0687047 A1 | 12/1995 |
| EP | 0743725 A1 | 11/1996 |
| EP | 0805527 A2 | 11/1997 |
| EP | 0823759 B1 | 2/1998 |
| EP | 0833419 A1 | 4/1998 |
| EP | 0840410 A2 | 5/1998 |
| EP | 0840410 A3 | 5/1998 |
| GB | 2190784 A | 11/1987 |
| GB | 2215906 A | 9/1989 |
| GB | 2241109 A | 8/1991 |
| JP | 55-65450 | 5/1980 |
| JP | 59067639 | 10/1985 |
| JP | 01123493 A | 5/1989 |
| JP | 02281782 | 11/1990 |
| JP | 03-6875 | 1/1991 |
| JP | 03016290 A | 1/1991 |
| JP | 04-359207 | 12/1992 |
| JP | 8-204263 | 8/1996 |
| JP | 10135548 A2 | 10/1996 |
| JP | 2005045195 * | 11/2003 |
| WO | WO 90/13158 | 11/1990 |
| WO | WO 91/05382 | 4/1991 |
| WO | WO 96/28846 | 9/1996 |
| WO | WO 98/35410 | 8/1998 |

| | | |
|---|---|---|
| WO | WO 98/35411 | 8/1998 |

OTHER PUBLICATIONS

ALC 1064-50P User's Manual, Amoco Laser Company, no date.
Laser Diodes and Bars, Coherent, Inc., no date.
Laser Mounts, Precision Laser Mounts, Four-Axis Adjustable Laser Mount, Vertical Laser Mounts; Creative Stars, 1997.
Endriz, John G., et al., "High Power Diode Laser Arrays," IEEE Journal of Quantum Electronics, Apr. 28, 1992, No. 4, pp. 952-965.
Hughes, D.W., et al., "Laser Diode Pumped Solid State Lasers," Journal of Physics D: Applied Physics 25, Apr. 14, 1992, No. 4, pp. 563-586.
"Circuit Module Cooling with Multiple Pistons Contacting a Heat Spreader/Electrical Buffer Plate in Contact with Chip," IBM Corp., IBM Technical Disclosure Bulletin, May 1989, vol. 31, No. 12, pp. 5-7.
"Heat Sink Assembly for Tab-Mounted Devices," IBM Corp., IBM Technical Disclosure Bulletin, Nov. 1988, vol. 31, No. 6, pp. 372-373.
Ishimori, Akira, et al., "Pumping Configuration Without Focusing Lenses for a Small-Sized Diode-Pumped Nd: YAG Slab Laser," Optics Letters, Jan. 1, 1992, vol. 17, No. 1, pp. 40-42.
Collimated Diode Laser Assemblies, Melles Griot, no date.
Cylindrical Laser Holders, Melles Griot, 1995.
Mundinger, D., et al., "High Average Power Edge Emitting Laser Diode Arrays on Silicon Microchannel Coolers," Applied Physics Letters 57, Nov. 19, 1990, No. 21, pp. 2172-2174.
Lasers Mounts, Newport, 1997.
Precision Gimbal Mounts, Oriel, 1992.
SDL-FL10, SDL, Inc., 1993.

* cited by examiner

CAST LASER OPTICAL BENCH

BACKGROUND OF THE INVENTION

1. Field of the Invention

The present invention is generally directed to optics and more specifically is directed to a bench for mounting optics in a laser system.

2. Description of the Prior Art

Benches for lasers traditionally comprise a bench base to which a number of separate component-holding supports are attached. For example, a common design for such a bench includes a bench base with a number of threaded holes set therein in a regular pattern. Threaded supports for holding optical components may be inserted into the threaded holes in the base, and the optical components may, in turn, be mounted onto the supports.

Such existing designs for optical benches have several shortcomings. They require a number of pieces to form the component-supporting structure. Further, the threaded connections between the component supports and the base may become loose over time, decreasing the accuracy of component placement. Also, a regular hole pattern may not coincide with the ideal mounting location of a component within the laser. In addition, if components are moved for experimentation or replacement, it is important to remember where on the base the component support was located if future setups are to replicate the original setup of the system. In general, the number of mounting components such as posts and fasteners in known optical bench systems increases the complexity and difficulty of using optical benches. There is a need for an optical bench that maintains the stability of component placement and ease of use over time while simultaneously allowing for flexibility in the setup of optical systems. The present invention is directed to such a system.

SUMMARY OF THE INVENTION

According to one embodiment of the present invention, an optical bench is provided with cast supports for holding optical components.

Optical benches according to the present invention may further incorporate pre-cast holes for the routing of electrical conduits, cooling conduits, and other conduits around and through the optical bench.

In addition, optical benches according to the present invention may incorporate kinematic mount components thereon, and in turn may be kinematically mounted to a separate mount.

Optical benches according to the present invention may include supports for optical components as well as non-optical components such as supporting electronics and plumbing.

According to some embodiments of the present invention, a cast optical bench is provided with excess material in strategic locations to enable the post-cast machining of the material for precise placement of optical components and/or supporting devices.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings, in which.

Figure 1:
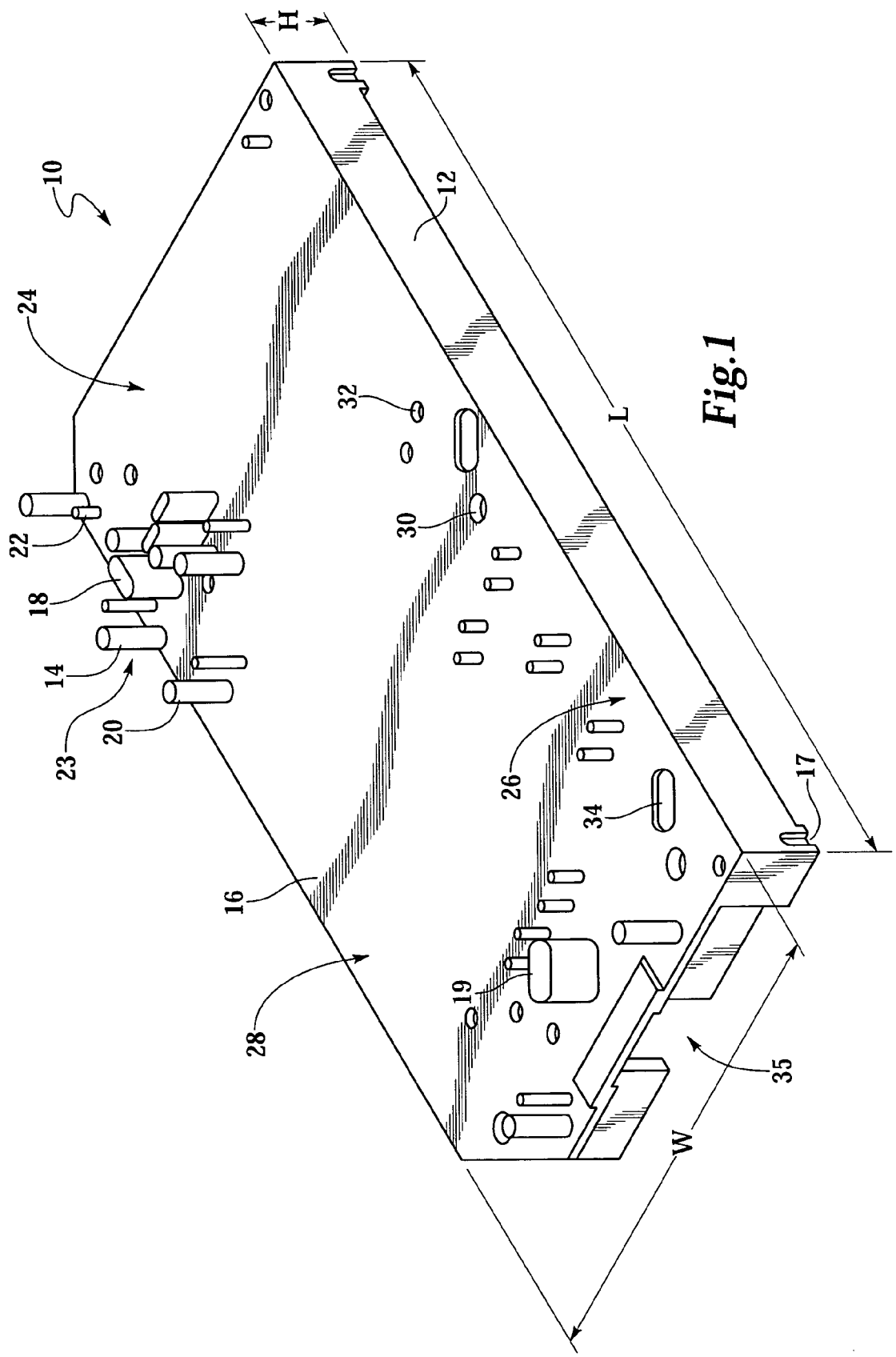
FIG. 1 is an isometric top view of an optical bench having cast optical supports.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF PREFERRED EMBODIMENTS

FIG. 1 shows an optical bench 10 according to one embodiment of the present invention. The optical bench 10 comprises a base 12 and a plurality of optical component supports 14 integral with the base 12 and projecting upwardly from a top surface 16 of the base 12. The optical bench 10 including the base 12 and the supports 14 is a single, contiguous piece of material. Mounting slots 17 may be provided in the optical bench 10 to facilitate mounting of the optical bench 10 to another support.

Optical benches according to the present invention may be created from different materials and manufactured using a number of different methods. One preferred method for manufacturing an optical bench according to the present invention is to cast the entire bench 10 of a single piece of aluminum. Such casting may be done by a variety of casting methods. One method that has been successfully used is the formation of a positive model of the optical bench out of a material such as wood. A negative of the bench is then formed by the packing of sand, with the negative being filled with liquid aluminum to form the positive cast piece. The rough cast piece may be provided with extra material in strategically-located positions, which is later machined to the precision required for optical applications, such as use as a laser bench. The cast piece is put through a process of heating and cooling to stabilize the piece, and then modified as required to complete the fine details of the completed bench. While aluminum is preferred for its thermal conductivity—which prevents distortions in the bench due to hot spots—and for its stiffness relative to its weight, other materials such as titanium, beryllium, or silicon carbide may be used.

As shown in FIG. 1, the optical component supports 14 may be spaced at a variety of distances over the top surface 16 of the optical bench 10, and spaced at a number of different heights to accommodate a variety of optical components and further to accommodate extra mounting hardware that may be necessary for the mounting of specific components. FIG. 1 shows that most optical component supports 14 have been formed as cylinders, but it is to be understood that component supports may be formed in a variety of shapes, such as the oval shape of component support 18. Component supports such as component support 19 may be provided with an initial shape as shown in FIG. 1, and later modified as necessary to support a specific component at a specific location. When cylindrical component supports are formed, it is preferred that taller component supports, such as component support 20, be formed with a wider diameter than shorter component supports such as component support 22 to reduce the likelihood of the component supports bending or otherwise becoming misaligned. Component supports may be provided in clusters 23 to provide increased mounting options in certain areas of the bench 10.

As will be understood more completely with reference to FIG. 4, below, optical benches according to the present invention may be designed with several different regions for mounting different types of components on the optical bench 10. These regions may be identified based on the stability required for components mounted in the regions. For example, the optical bench shown in FIGS. 1-3 has a first region 24 for mounting components which require the most stability (such as a main oscillator, shown in FIG. 3), a second region 26 for mounting components which require an intermediate amount of stability (such as a gain module, shown in FIG. 3), and a third region 28 for mounting components which require the least stability (such as support electronics, shown in FIG. 3).

Also shown in FIG. 1 are a plurality of apertures 30 formed in the optical bench 10 during the casting process. The apertures 30 are designed and spaced to allow conduits such as electrical conduits for optical components and support electronics to be routed through the optical bench 10, providing for convenient routing of wiring and positioning of plumbing components. Apertures may be provided in a variety of shapes or sizes depending on the particular use of the optical bench. For example, round apertures 32 may be provided for routing single conduits or small bundles of conduits, and oval-shaped apertures 34 may be provided for routing larger conduits or larger bundles of conduits, such as incoming and outgoing cooling conduits. A side cutaway portion 35 allows for the routing of conduits away from the optical bench 10.

Optical benches 10 according to the present invention may be constructed in a variety of shapes and dimensions. For example, the optical bench shown in FIG. 1 has a length, L, of approximately 60", a width, W, of approximately 30", and a height, h, of approximately 4". The optical component supports 14 are provided with heights of from about ½" to about 6" and diameters of from about 1.5" to about 1.5".

Figure 2:
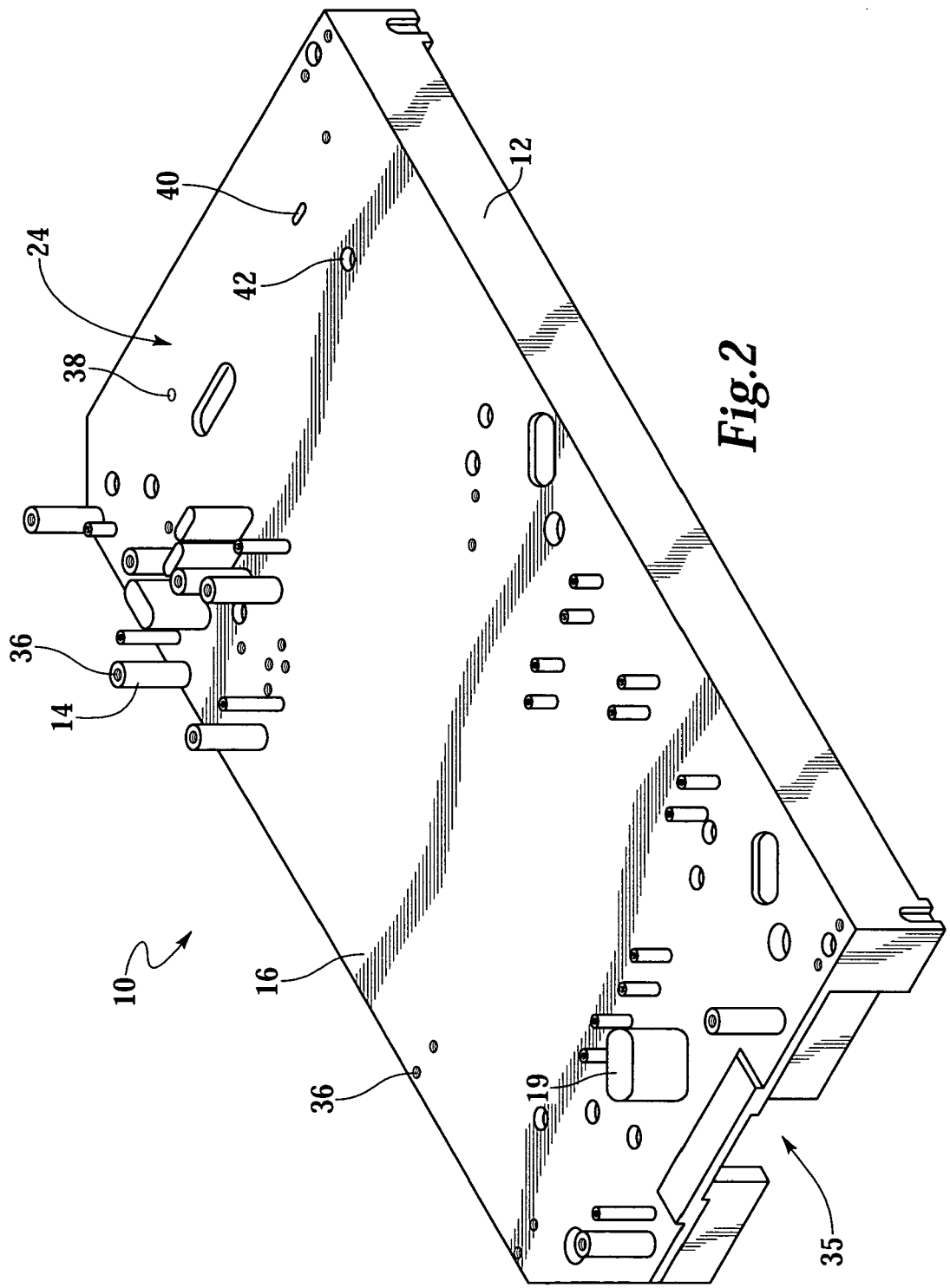
FIG. 2 is an isometric top view of the optical bench of FIG. 1 further showing threaded optical supports and additional mounting locations.

Turning now to FIG. 2, the optical bench 10 is shown with additional modifications for the mounting of optical components. Threaded holes 36 are provided in the optical component supports 14 to accept mounting screws for optical component mounts or for threaded optical components. Threaded holes 36 are also provided in the base 12 for the direct mounting of optical components or support components to the base 12.

The first region 24 of the optical bench 10 is shown with kinematic mount components formed into the top surface 16 of the base 12. Kinematic mounts are provided to fix optical components in predetermined positions while also allowing for thermal expansion of the optical components. A surface kinematic mount cone 38, a surface kinematic mount groove 40, and a surface kinematic mount plane 42 combine to allow kinematic mounting of a component to the first region 24.

Figure 3:
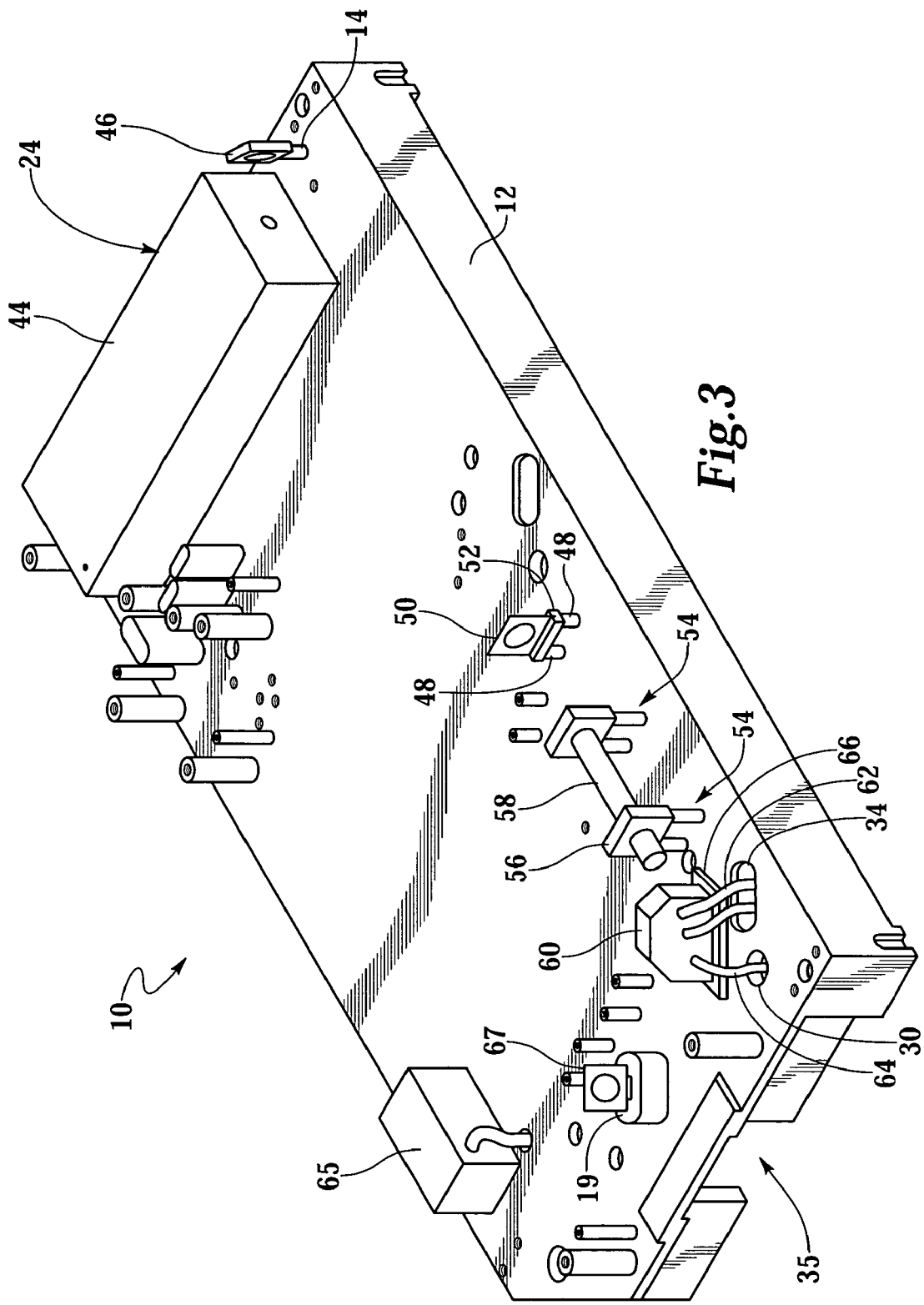
FIG. 3 is an isometric top view of the optical bench of FIGS. 1 and 2 showing optical components mounted to optical supports.

It is preferred to place the optical component supports 14 in locations that allow for versatility in mounting optical components to the bench 10. Turning now to FIG. 3, an optical bench 10 is shown with components mounted thereon. A main oscillator 44 is kinematically mounted to the first region 24 of the optical bench 10. A mirror 46 is mounted to an optical component support 14 and is adapted to reflect output radiation from the main oscillator 44. Two lens supports 48 are used together to support a lens 50 to accept the radiation from the mirror 46. As shown in FIG. 3, the lens 50 is, in turn, attached to a lens mount 52 which enables fine control of lens positioning. It is to be understood that optical components may be attached to the optical component supports of the present invention via intermediate mounts that allow for more precise positioning of the optical components.

Aligned pairs of supports 54 support telescope mounts 56, which in turn support a telescope 58. In the embodiment of FIG. 3, the telescope 58 directs radiation from the main oscillator 44 to a gain module 60, which converts the radiation from the main oscillator 44 to a desired output beam. The gain module 60 is cooled by cooling conduits 62 which extend through an oval-shaped aperture 34, and is supplied with power by an electrical conduit 64, which extends through an aperture 30. The gain module 60 may receive power, control signals, or other electrical inputs from support electronics 65 provided on the optical bench 10. The gain module 60 is mounted to a supplemental support 66, which is mounted directly to the optical bench 10. The output beam from the gain module 60 may be directed to different components mounted throughout the optical bench. In addition to lenses, mirrors, and telescope mounts, such components as apertures, wave plates, power meters, Faraday rotators, and the like may be mounted to optical component supports or directly to threaded holes 36 in the base 12 of the optical bench. As shown in FIG. 3, light from the gain module 60 may be reflected away from the bench 10 by a mirror such as mirror 67, which is shown mounted to component support 19. The component support 19 has been modified from its original shape, shown in FIG. 1. The component support has been machined to hold the mirror 67 at the correct location for the application shown in FIG. 3.

Figure 4:
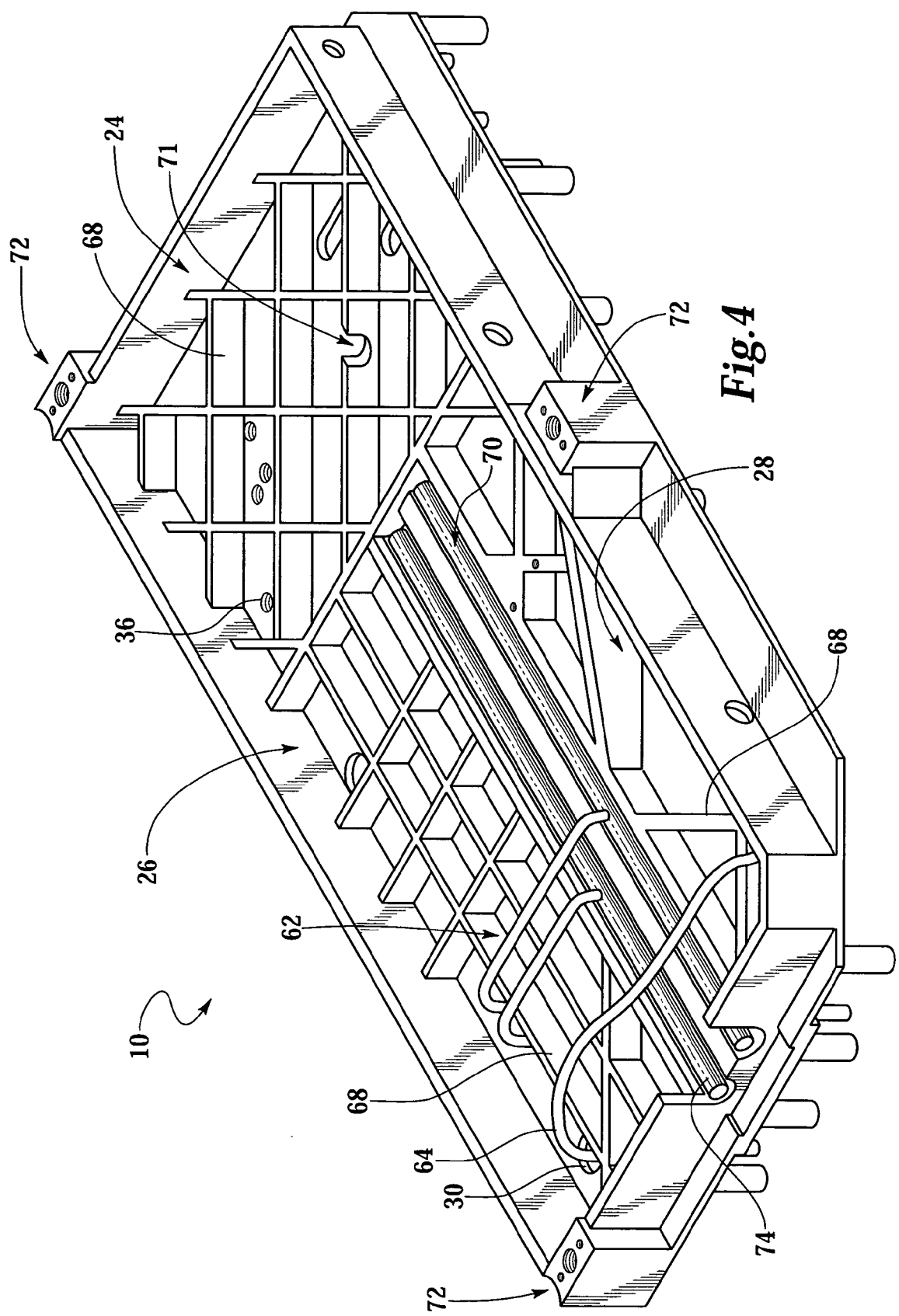
FIG. 4 is an isometric bottom view of the optical bench of FIGS. 1-3.

Turning now to FIG. 4, an isometric view of the underside of an optical bench 10 is shown. FIG. 4 shows the bench as cast and modified by post-casting holes or mounting areas. Support struts 68 are provided in the underside of the bench 10 to provide rigidity to the bench 10. Support struts 68 in the first region 24, which is adapted to hold components requiring the most rigidity, are spaced closely together, while support struts in the second and third regions 26 and 28 are placed progressively farther apart to support components requiring less rigidity. Conduit guides 70 are provided in the optical bench 10 to guide conduits beneath the top surface 16 of the bench 10. Threaded holes 36 can be seen extending to the underside of the bench, as can apertures 30. Cutout areas 71 may be provided in the support struts 68 for the routing of conduits.

An optical bench may be kinematically mounted to another optical support component, such as a table. Kinematic mount areas 72 are provided in the underside of the bench 10 either for direct kinematic mounting or for the attachment of intermediate kinematic mount components to the bench 10.

Also shown in FIG. 4 are cooling conduits 62 extending toward components mounted to the top surface 16 (not shown in FIG. 4) of the bench 10 from main conduits 74 running through the conduit guides 70. An electrical conduit 64 is shown extending from an aperture 30 beneath the optical bench 10 to another aperture for routing power or electrical signals to components on the optical bench 10.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A cast bench for holding laser components comprising:
a base having a top surface; and
a plurality of optical component supports cast with and integral with said base and extending from said top surface, said optical component supports being positioned to support optical components;
wherein said bench is provided with rigidity by cast support struts integral with said base, said cast support struts being spaced to form at least a first support region and a second support region, said first support region having support struts spaced more closely together than the support struts of said second support region.

2. A cast bench for holding laser components comprising:
a base having a top surface;
a plurality of optical component supports cast with and integral with said base and extending from said top surface, said optical component supports being positioned to support optical components; and
at least one aperture cast into said bench through said top surface of said base, said aperture being adapted to accept conduits therethrough for connection to components mounted on said bench.

3. The bench of claim 2 further comprising at least one conduit guide beneath said top surface of said bench for routing said conduits beneath said top surface.

4. An optical mounting system comprising:
a cast base;
a plurality of optical component supports cast with and integral with said cast base and extending outwardly from a top surface of said cast base;
a plurality of support struts integral with said base and spaced beneath said top surface of said cast base to form a first region and a second region of said cast base, the support struts providing rigidity to said cast base, said first region having said support struts spaced more closely together than the support struts of said second region; and
kinematic mount components provided in said top surface of said cast base at said first region of said cast base.

5. An optical mounting system comprising:
a cast base;
a plurality of optical component supports cast with and integral with said cast base and extending outwardly from said top surface of said cast base;
a plurality of support struts integral with said base and spaced beneath said top surface of said cast base to form a first region and a second region of said cast base, said first region having said support struts spaced more closely together than the support struts of said second region; and
kinematic mount components provided in said top surface of said cast base at said first region of said cast base;
a main oscillator mounted on said kinematic mount components; and
a gain module mounted on said base at said second region, wherein an aperture is included through said top surface of said base for accepting at least one conduit from said main oscillator and at least one conduit guide beneath said top surface of said base for guiding said conduit.

6. The optical mounting system of claim 4 wherein at least one of said optical component supports is a customizable optical component support cast with additional material for machining into a customized optical component mount.

* * * * *